United States Patent [19]

Morales

[11] 3,863,046

[45] Jan. 28, 1975

[54] CURRENT CONTROLLING DEVICE

[76] Inventor: David Ocampo Morales, No. 37 Benito Diez de Gamorra, Ciudad Satelite, Mexico

[22] Filed: Nov. 15, 1972

[21] Appl. No.: 306,711

[52] U.S. Cl. .................................. 219/132, 219/134
[51] Int. Cl. .............................................. B23k 9/10
[58] Field of Search .................................. 217/132; 219/132–134

[56] References Cited
UNITED STATES PATENTS

| | | | |
|---|---|---|---|
| 2,223,692 | 12/1940 | Marel | 219/133 X |
| 2,328,596 | 9/1943 | Winsor | 219/134 |
| 2,686,239 | 8/1954 | Burbeck | 219/132 X |
| 2,734,116 | 2/1956 | Rybolt | 219/134 |
| 2,964,681 | 12/1960 | Anderson | 219/132 X |
| 3,041,526 | 6/1962 | Rybolt | 219/132 X |
| 3,551,638 | 12/1970 | Campbell | 219/134 |

FOREIGN PATENTS OR APPLICATIONS
1,413,087    3/1964   France ............................... 219/133

*Primary Examiner*—Bruce A. Reynolds
*Attorney, Agent, or Firm*—Albert L. Jeffers; Roger M. Rickert

[57] ABSTRACT

A current controlling device, especially for use with a motor generator employed for welding in which the motor of the motor generator is connected to a source of power by way of a relay which is normally open and which is adapted for being controlled by a control relay having a low voltage actuating coil. A low voltage supply is provided connected in circuit with the actuating coil of the control relay and the energizing of the control relay is accomplished by a switch mounted on an electrode holder to which power is supplied from the aforementioned generator.

3 Claims, No Drawings

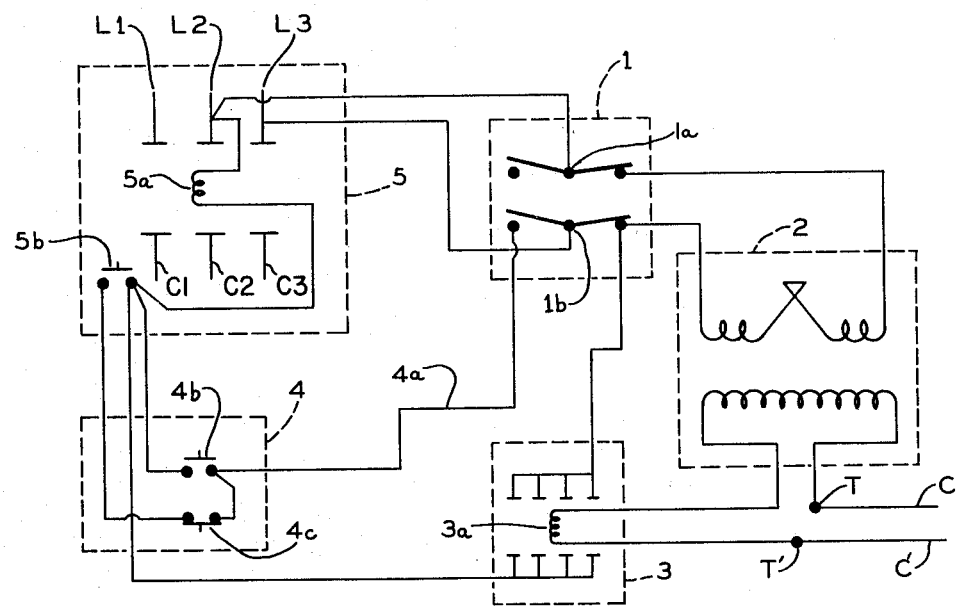

CURRENT CONTROLLING DEVICE

The present invention relates to a current or power control device and, in particular, refers to such a device employed in connection with a motor generator installation employed for welding or like operations.

Motor generators of the nature referred to have a number of advantages and are relatively efficient and have long, useful life and low maintenance costs. However, such installations use a considerable amount of power because the motor is usually continuously energized and the power consumption is, therefore, greater than what occurs with other devices, such as devices powered directly by a transformer.

The motor generator of a motor generator installation is ordinarily necessarily remote from the working point so that the control thereof is not convenient to the operator. This leads to permitting the motor to be continuously energized during a working period rather than to be energized only during the time that power is required at the work site.

With the foregoing in mind, the primary objective of the present invention is the provision of an arrangement which requires a power supply to the motor of a motor generator only during the period that it is desired to draw power from the generator.

Another object of the present invention is the provision of a control device of the nature referred to which can be incorporated in new manufacture as well as in existing motor generator installations.

A particular object of the present invention is the provision of a control device of the nature referred to which is under the control of a worker at the working site so that the worker does not need to leave the working site to control the motor generator installation.

Still another object is the provision of a control device of the nature referred to which adds to the useful life of the motor and generator and reduces the maintenance requirements and, in particular, substantially reduces the power consumed over a period of time.

The foregoing objects and well as other objects and advantages of the present invention will become more apparent upon reference to the following detailed specification taken in connection with the accompanying drawings in which:

FIG. 1 is a schematic circuit diagram of a control device according to the present invention; and FIG. 2 shows an electrode holder having a switch mounted thereon and forming a part of the present invention.

BRIEF SUMMARY OF THE INVENTION

In the present invention, a normally open relay is interposed between a source of power and the motor of a motor generator installation which is adapted for supplying power for welding operations and the like. The aforementioned relay is under the control of a control relay which has a low voltage actuating coil and this coil is in circuit with a manual switch on the electrode holder and a low voltage source of power so that the motor is energized only when the workman grasps the electrode holder for a work operation. The low voltage control circuit is bypassed by a conventional control circuit so that either of the control circuits can be made selectively effective.

DETAILED DESCRIPTION OF THE INVENTION

Figure 1:
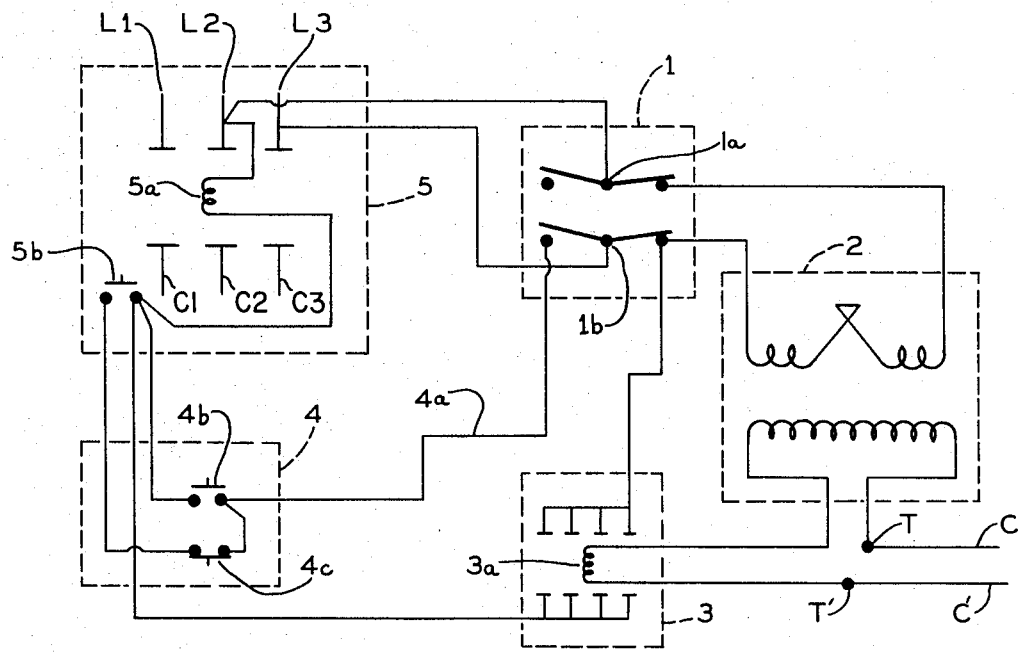

Referring to the drawings somewhat more in detail, FIG. 1 shows a main relay 5 having actuating coil 5a with power lines L1, L2 and L3 leading thereto. The power lines are connected to contacts C1, C2, and C3, upon energization of coil 5a, and close on other contacts to connect the power lines to the terminals of the motor of a motor generator set which is of conventional nature and which is not shown in the drawings. Relay 5 also includes a blade 5b providing a holding circuit for coil 5a under certain conditions of operation.

Power lines L2 and L3 are connected to terminals 1a and 1b of a selector switch 1 which, in a first position, connects the aforementioned terminals to the opposite ends of the primary coil of a step down transformer 2 which has a secondary coil. The power lines L1, L2 and L3, representing a source of power, may be at a higher voltage, for example, 220 or 240 volts, whereas the secondary coil of transformer 2 provides a substantially low voltage, say, about 24 volts.

One end of the secondary of transformer 2 is connected to a terminal T and the other side is connected through the coil 3a of a normally open control relay 3 to a terminal T'. Control relay 3, when energized, completes a circuit from power line L3 to terminal 1b and then through the contacts of relay 3 back to one end of actuating coil 5a of relay 5 then back to power line L2. Thus, with selector switch 1 in the illustrated position, energization of actuating coil 3a of relay 3 will bring about energization of coil 5a of relay 5.

Figure 2:
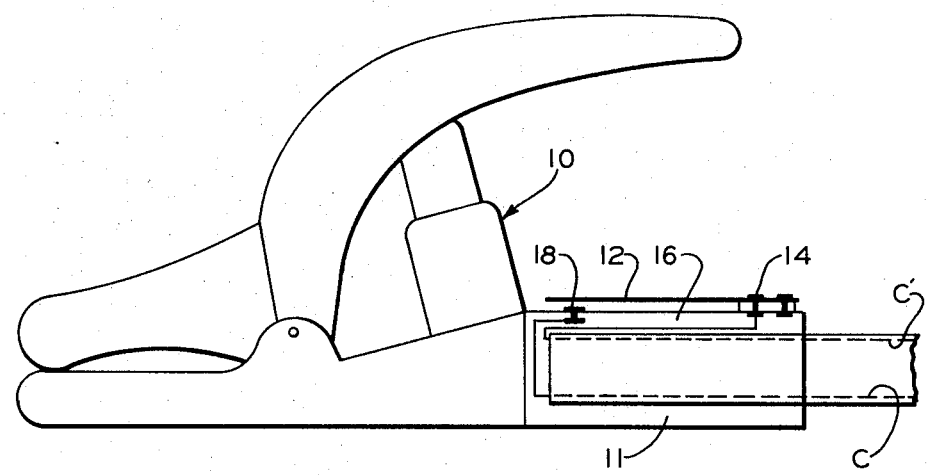

Terminals T and T' are connected by wires C and C' with a switch carried by the electrode holder generally indicated at 10 in FIG. 2. Wire C is connected to a terminal 18 and wire C' is connected to a terminal 14. Connected to terminal 14 is a resilient blade 12 which will close on terminal 18 when the handle 11 of the electrode holder is gripped by a workman.

Upon releasing the handle, blade 12 will separate from terminal 18. The handle 11 of the electrode holder may be especially configured in the region 16 to receive the switch arrangement above described and which switch arrangement could, of course, be replaced by any suitable manual switch which would close upon grasping handle 11 and which would open upon releasing of handle 11.

In the event that it is not desired to control relay 5 through control relay 3 and the aforementioned switch, selector switch 1 can be tilted to a second position, wherein the primary of a transformer 2 is disconnected from power lines L2 and L3, and wherein, instead, power line L3 is connected to a wire 4a leading to one side of a normally open push button switch 4b in the switch block 4, the other side of the push button switch being connected to the end of relay coil 5a which is opposite power line L2. With selector switch 1 tilted to its second position, the coil of relay 5a can be energized by closing switch 4b and will thereafter hold through holding switch blade 5b until the stop push button 4c is opened.

The arrangement of the present invention thus provides for two types of controls for the main relay which controls the supply of power to the motor of the motor generator set.

A substantial savings of power can be realized by the practice of the present invention as shown by the following examples:

EXAMPLE I

After operating a motor generator type apparatus having electrodes of a diameter of 3.96 millimeters for six working days, the following results were obtained:

| | |
|---|---|
| Consumption of electric power without the control according to the present invention | — 555.98 KWH |
| Consumption of electric power with the control device of the present invention | — 398.95 KWH |
| Weekly savings of electric power | — 157.03 KWH |
| Percent of power saved by use of the device | — 28.7% |

EXAMPLE II

In a second example, also for six working days:

| | |
|---|---|
| Consumptioin of electric power without the control device according to the present invention | — 409.4 KWH |
| Consumption of electric power with the control device of the present invention | — 186.32 KWH |
| Percent of power saved by use of the device | — 54.6% |

EXAMPLE III

A further test extending over a 27 day period:

| | |
|---|---|
| Consumption of electric power without the control device according to the present invention | — 2,402.4 KWH |
| Consumption of electric power with the control device of the present invention | — 640.9 KWH |
| Percent of power saved by use of the device | — 73.3% |

From the foregoing, it will be evident that the control device according to the present invention effects a substantial savings of power while at the same time the device is convenient to use and is, as mentioned, adapted for incorporation in existing equipment as well as in new manufacture.

Modifications may be made within the scope of the appended claims.

What is claimed is:

1. A control device for controlling the supply of power to the motor of a motor-generator set used for welding, said device comprising: a first normally open relay between the motor which drives the generator and a source of power and having an actuating coil, a second normally open relay connected in controlling relation to the actuating coil of said first relay and also having an actuating coil, an electrode holder, a manually operable switch on said electrode holder connected in controlling relation to the actuating coil of said second relay, a step down transformer having the primary side connected to said source of power and having a lower voltage secondary side connected in series with the actuating coil of said second relay and said manual switch only so that the actuating coil of said second relay is energized when the manual switch is closed and de-energized when the manual switch is open.

2. A control device according to claim 1 which includes a selector switch interposed between the primary side of said transformer and said source of power, said selector switch having a first position wherein said source of power is connected to said primary side of said transformer and a second position wherein said source of power is disconnected from said primary side of said transformer, a pushbutton switch, said selector switch in said second position connecting said pushbutton switch in circuit with said source of power and the actuating coil of said first relay, a holding blade actuated into closed position by actuation of said first relay, a stop switch, said holding blade and stop switch being connected in series and in parallel with said pushbutton switch.

3. A control device according to claim 1 in which said manual switch is a normally open switch and is actuated into closed position in response to grasping of said holder for a work operation.

* * * * *